(12) United States Patent
Zhang

(10) Patent No.: US 12,270,666 B2
(45) Date of Patent: Apr. 8, 2025

(54) ORDER MANAGEMENT METHOD APPLIED TO ELECTRIC VEHICLE AND APPARATUS

(71) Applicant: Shenzhen Yinwang Intelligent Technologies Co., Ltd., Shenzhen (CN)

(72) Inventor: Xiaoyu Zhang, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 163 days.

(21) Appl. No.: 17/854,753

(22) Filed: Jun. 30, 2022

(65) Prior Publication Data

US 2022/0341744 A1     Oct. 27, 2022

Related U.S. Application Data

(63) Continuation of application No. PCT/CN2019/130506, filed on Dec. 31, 2019.

(51) Int. Cl.
    *G01C 21/34*      (2006.01)
    *G06Q 50/10*      (2012.01)
    *G06Q 50/40*      (2024.01)

(52) U.S. Cl.
    CPC ....... *G01C 21/3469* (2013.01); *G01C 21/343* (2013.01); *G06Q 50/10* (2013.01); *G06Q 50/40* (2024.01)

(58) Field of Classification Search
    CPC .......................... G01C 21/3469; G01C 21/343
    See application file for complete search history.

(56) References Cited

U.S. PATENT DOCUMENTS

| | | | |
|---|---|---|---|
| 10,042,359 B1 * | 8/2018 | Konrardy | G06Q 50/40 |
| 10,324,463 B1 * | 6/2019 | Konrardy | G01S 19/39 |
| 10,395,332 B1 * | 8/2019 | Konrardy | G01S 5/0027 |
| 2010/0094496 A1 * | 4/2010 | Hershkovitz | B60L 50/66 701/22 |
| 2013/0226441 A1 * | 8/2013 | Horita | G01C 21/3469 701/117 |
| 2014/0163865 A1 * | 6/2014 | Mineta | G01C 21/3469 701/409 |

(Continued)

FOREIGN PATENT DOCUMENTS

| | | |
|---|---|---|
| CN | 107748941 A | 3/2018 |
| CN | 109635985 A | 4/2019 |

(Continued)

*Primary Examiner* — Long T Tran

(74) *Attorney, Agent, or Firm* — Leydig, Voit & Mayer, Ltd.

(57) ABSTRACT

An order management method applied to an electric vehicle is provided. An order allocation apparatus at a platform obtains information about each commercial vehicle and a location of a safe point. The information about the vehicle includes information about an electric commercial vehicle, for example, a current location and a remaining power of the vehicle. The order allocation apparatus selects a service vehicle for a passenger. When the service vehicle is the electric vehicle, it is ensured that a remaining power of the service vehicle is sufficient to complete a safe driving route, and the safe driving route is a route connecting a current location of the candidate vehicle, a start location, a destination location, and a location of a safe point closest to the destination location. The order allocation apparatus allocates an order to the service vehicle.

20 Claims, 7 Drawing Sheets

(56) References Cited

U.S. PATENT DOCUMENTS

| | | | | |
|---|---|---|---|---|
| 2014/0278038 A1* | 9/2014 | Stankoulov | ........... | G06T 11/203 |
| | | | | 701/123 |
| 2016/0153796 A1* | 6/2016 | Stankoulov | ........ | G01C 21/3469 |
| | | | | 701/123 |
| 2019/0107406 A1* | 4/2019 | Cox | ........................ | G01S 19/42 |

FOREIGN PATENT DOCUMENTS

| | | | |
|---|---|---|---|
| CN | 109658203 | A | 4/2019 |
| CN | 110598908 | A | 12/2019 |
| CN | 110598985 | A | 12/2019 |
| EP | 3581430 | A1 | 12/2019 |
| WO | 2018217640 | A1 | 11/2018 |

* cited by examiner

ORDER MANAGEMENT METHOD APPLIED TO ELECTRIC VEHICLE AND APPARATUS

CROSS-REFERENCE TO RELATED APPLICATIONS

This application is a continuation of International Application No. PCT/CN2019/130506, filed on Dec. 31, 2019, the disclosure of which is hereby incorporated by reference in its entirety.

TECHNICAL FIELD

This application relates to the automotive field, and in particular, to an order management method for an electric vehicle and an apparatus.

BACKGROUND

With the continuous expansion of urban population and urban scale in our country, urban transportation problems become more and more serious, and requirements for convenient private travel modes such as taxis are increasing year by year. Driven by market trends, smart travel will become an important part of future travel modes. Nowadays, the rapid development of Internet technologies, the rapid increase in the penetration rate of smartphones, and the rapid development of mobile networks have greatly promoted the rise of a car hailing software market, which enriches people's travel modes.

Currently, a mode in which a passenger sends a travel requirement by using a passenger end of car hailing software and a driver receives the travel requirement of the passenger by using a driver end of the car hailing software has been relatively popular and mature. A background server of the car hailing software may intelligently allocate an order based on a location of the driver, a location of the passenger, and a destination.

However, in the transportation field, vehicle electrification has gradually become a trend. Electric vehicles replace conventional fossil energy with electric energy of diversified sources. This cannot only significantly improve energy conversion efficiency, but also help reduce greenhouse gas emissions, improve air quality, and reduce noise pollution. With the continuous expansion of an electric vehicle market, electric vehicles account for an increasingly high proportion of commercial vehicles. Taxi order allocation faces new problems. For example, a driver dares not receive an order when power is insufficient, or after receiving an order, a driver finds that remaining power of the electric vehicle cannot support to complete the order. All these urgent problems need to be resolved.

SUMMARY

This application provides an order management method applied to an electric vehicle and an apparatus, to resolve a problem that an order cannot be completed by using a power of the electric vehicle.

According to a first aspect, this application provides an order management method applied to an electric vehicle. An order allocation apparatus on a platform obtains vehicle information about each commercial vehicle and safe point information, and when the commercial vehicle is the electric vehicle, the vehicle information includes a current location and a remaining power of the vehicle. The order allocation apparatus selects a candidate vehicle for a passenger, and when the candidate vehicle is the electric vehicle, generate a safe driving route for the candidate vehicle. The safe driving route is a route connecting the current location of the candidate vehicle, a start location of the passenger, a destination location of the passenger, and a location of a safe point closest to the destination location. After ensuring that a remaining power of the candidate vehicle is sufficient to complete the safe driving route, the order allocation apparatus sends an order allocation message to the candidate vehicle, to notify the candidate vehicle as a service vehicle of the passenger.

In the foregoing manner, after completing an order, the electric vehicle still has a sufficient power to reach the rechargeable safe point. This ensures power safety of the electric vehicle after the order is completed.

In this embodiment, that the remaining power of the vehicle is sufficient to complete a route may be estimating that the remaining power of the vehicle still exceeds a safe power threshold after the route is completed. The safe power threshold may be a power percentage, or may be a safe power value. For example, the safe power threshold is 20% of a total power, or the safe power value is 10 gigawatt hours. In this embodiment, the safe power value is used as an example for description.

Further, in a process in which the service vehicle provides a transport service for the passenger, the order allocation apparatus continuously monitors a remaining power and a location of the service vehicle, and generates a safe alternative route for the service vehicle when it is determined that a current remaining power of the service vehicle is insufficient to complete a remaining safe driving route. The safe alternative route indicates a location of a safe point closest to the service vehicle. When it is determined that the current remaining power of the selected vehicle is sufficient to complete the safe alternative route, the order allocation apparatus continues to monitor the remaining power and the location of the service vehicle, to keep the service vehicle continuing to execute the order.

In an order execution process, in this application, when it is found that the remaining safe driving route may not be completed by using the remaining power of the vehicle, the safe alternative route is defined. If the service vehicle has a sufficient remaining power to reach the safe point for charging (for example, a difference obtained by subtracting an estimated power consumption required by the safe alternative route from the current remaining power of the service vehicle is greater than the safe power threshold), the service vehicle is maintained to continue to execute the order under a condition that it is ensured that the service vehicle can go to the safe point for charging at any time. In this way, the order is completed as much as possible to improve an order completion rate of a driver. In addition, when the current remaining power of the service vehicle is insufficient to complete the safe alternative route (for example, a difference obtained by subtracting the estimated power consumption required by the safe alternative route from the current remaining power of the service vehicle is less than the safe power threshold), it indicates that there is a risk that the service vehicle reaches, by using the remaining power of the service vehicle, the safe point for charging. In this case, the order needs to be terminated, and a current location of the vehicle is a location of a point that is closest to the destination of the order and that the vehicle can reach, which brings convenience to the passenger in the vehicle and ensures that the vehicle can go to the rechargeable safe point.

In a possible implementation, the order allocation apparatus may further send a power saving notification to the service vehicle when it is determine that the current remaining power of the service vehicle is sufficient to complete the safe alternative route (for example, a difference obtained by subtracting the estimated power consumption required by the safe alternative route from the current remaining power of the service vehicle is greater than the safe power threshold), but is insufficient to complete the remaining safe driving route (for example, a difference obtained by subtracting the estimated power consumption required by the remaining safe driving route from the current remaining power of the service vehicle is less than the safe power threshold), to reduce a power consumption of the service vehicle and improve order completion possibility.

In an initial order allocation phase, when it is determined that the remaining power of the candidate vehicle is insufficient to complete the safe driving route, the order allocation apparatus sends a warning message to the candidate vehicle, and cancels the candidate vehicle. The warning message indicates that a reason why order allocation fails is that the vehicle has an insufficient power. The warning message is sent to the candidate vehicle, to remind the candidate vehicle that a reason why no order is allocated to the candidate vehicle this time is that the power is insufficient, so that the driver obtains a vehicle power reminder. After receiving one or more reminders, the driver may choose to charge the vehicle, to avoid a case in which the driver cannot receive an order after waiting for the order for a long time.

Further, the foregoing estimated power consumption may be calculated for the vehicle. Specifically, the order allocation apparatus calculates an average power consumption per kilometer of the vehicle based on a historical driving mileage record and a historical power consumption record of the vehicle, and calculates, based on the average power consumption per kilometer of the vehicle, an estimated power consumption required by the safe driving route. In this application, in addition to considering a power consumption based on a driving route distance, factors such as different basic power consumptions of different vehicles, a driving environment, and a driving habit are further considered. This improves calculation accuracy of the power consumption. In this application, information about a historical average power consumption per kilometer of the vehicle may be further collected from a vehicle client, to pertinently calculate an estimated power consumption of the vehicle for completing a driving route.

The vehicle information about the electric vehicle further includes the safe power threshold. The safe power threshold may be set by a driver of the electric vehicle, or may be set by a platform.

The safe point information may be specifically a location of a safe point, or may be information used by the order allocation apparatus to obtain a location of a safe point of each commercial vehicle, for example, a private safe point identifier set by the driver.

According to a second aspect, this application further provides another order management method applied to an electric vehicle. The present method is performed by a vehicle server on a driver side. The vehicle server may be a control system of the vehicle, or may be a terminal of a driver, or may be car hailing software installed on a terminal of a driver. The vehicle server sends vehicle information to an order allocation apparatus at a platform. The vehicle information includes a current location and a remaining power of a vehicle. The vehicle server receives an order allocation message sent by the order allocation apparatus. The order allocation message carries a start location and a destination location of a passenger. The vehicle server receives an order when determining that the remaining power of the vehicle is sufficient to complete a safe driving route, and provides a transport service for the passenger. The safe driving route is a route connecting the current location of the vehicle, the start location of the passenger, the destination location of the passenger, and a location of a safe point closest to the destination location, and the safe point is a charging point of the electric vehicle.

In this application, after the order allocation message sent by the order allocation apparatus at the platform is received, whether the remaining power of the vehicle can meet the safe driving route of the order is determined at the vehicle server. In this way, after completing the order, the electric vehicle still has a sufficient power to reach a rechargeable safe point. This ensures power safety of the electric vehicle after the order is completed. The safe driving route may be determined by the order allocation apparatus and then carried in the order allocation message to be transferred to the vehicle server, or may be locally generated by the vehicle server.

In a process of providing the transport service for the passenger, the vehicle server continuously monitors the remaining power and the location of the vehicle, and generates a safe alternative route when it is determined that the current remaining power of the vehicle is insufficient to complete a remaining safe driving route, and when it is determined that the current remaining power of the vehicle is sufficient to complete the safe alternative route, the vehicle server continues to execute the order and monitor the remaining power and the location of the vehicle. Similar to the foregoing aspect, in this application, after it is found that the safe driving route may not be completed, the safe alternative route is generated. If the current remaining power of the vehicle is sufficient to complete the safe alternative route, it indicates that the vehicle has a sufficient remaining power to reach the safe point for charging. The vehicle continues to execute the order under a condition that it is ensured that the vehicle can go to the safe point for charging at any time, to complete the order as much as possible. This improves an order completion rate of the driver.

In addition, when the current remaining power of the vehicle is insufficient to complete the safe alternative route, it indicates that there is a risk that the vehicle reaches, by using the remaining power of vehicle, the safe point for charging. In this case, the order needs to be terminated, and the current location of the vehicle is a location of a point that is closest to the destination of the order and that the vehicle can reach, which brings convenience to the passenger in the vehicle and ensures that the vehicle can go to a rechargeable safe point as soon as possible by using a safe power threshold.

When it is determined that a difference obtained by subtracting an estimated power consumption required by the safe alternative route from the current remaining power of the vehicle is greater than the safe power threshold, the vehicle may further take a power saving measure.

The vehicle server may further calculate an average power consumption per kilometer of the vehicle based on a historical driving mileage record and a historical power consumption record of the vehicle, and calculate, based on the average power consumption per kilometer of the vehicle, an estimated power consumption required by the safe driving route. Accuracy of an estimated power consumption required by a driving route is improved by obtaining the average power consumption per kilometer of the vehicle.

According to a third aspect, this application provides an order allocation apparatus, including a vehicle information obtaining module, a passenger information obtaining module, a route planning module, an order management module, and a power assurance module, configured to execute the functions of the order allocation apparatus according to the first aspect.

Specifically, the power assurance module may be responsible for calculating an average power consumption per kilometer of a vehicle and calculating an estimated power consumption required by each driving route.

According to a fourth aspect, this application provides a vehicle server apparatus, including a sending module, a receiving module, an order response module, a monitoring module, and a power calculation module, configured to execute the functions of the vehicle server according to the second aspect.

Specifically, the power calculation module may be responsible for calculating an average power consumption per kilometer of a vehicle and calculating an estimated power consumption required by each driving route.

According to a fifth aspect, this application provides another order management method applied to an electric vehicle. An order allocation apparatus obtains vehicle information about a plurality of commercial vehicles and safe point information. The commercial vehicles include the electric vehicle, vehicle information about the electric vehicle includes a current location and a remaining power of the vehicle, and the safe point is a charging point of the electric vehicle. The order allocation apparatus receives order request information sent by a client of a passenger, and the order request information includes a start location and a destination location. The order allocation apparatus selects a service vehicle for the passenger based on the vehicle information, the order request information, and the safe point information. When the service vehicle is the electric vehicle, a remaining power of the service vehicle is sufficient to complete a safe driving route, and the safe driving route is a route connecting a current location of the service vehicle, the start location, the destination location, and a location of a safe point closest to the destination location. The order allocation apparatus sends an order allocation message to the service vehicle, to notify the service vehicle to provide a transport service for the passenger.

According to a sixth aspect, this application provides another order allocation apparatus, including a processor and a memory. The memory stores instructions, and when the processor executes the instructions in the memory, the order allocation apparatus performs the method according to the first aspect or the fifth aspect.

According to a seventh aspect, this application provides another vehicle server apparatus, including a processor and a memory. The memory stores instructions, and when the processor executes the instructions in the memory, the vehicle server apparatus performs the method according to the second aspect.

According to an eighth aspect, this application provides a non-transitory computer storage medium. The computer medium stores a computer program, and when the computer program is executed by a processor, the method according to the first aspect, the second aspect, and the fifth aspect or any specific implementation of the first aspect, the second aspect, and the fifth aspect is implemented.

In this application, based on the implementations according to the foregoing aspects, the implementations may be further combined to provide more implementations.

DETAILED DESCRIPTION OF ILLUSTRATIVE EMBODIMENTS

As the continuous expansion of an electric vehicle market, more and more electric vehicles serve as commercial vehicles to serve passengers. However, there are many new problems in order allocation for the electric vehicles. Different from a fossil fuel-powered vehicle, the electric vehicle has a relatively low recharge rate. When the electric vehicle has a low power, and the electric vehicle needs to be charged, it basically takes one hour or more time to complete the charging. After a ride order is allocated to the electric vehicle for operation, if the electric vehicle runs out of power on the way to a destination of the order, it will cause great inconvenience to a driver and a passenger. Therefore, a current order allocation manner for the fossil fuel-powered vehicle is not applicable to order allocation for the electric vehicle.

When an order is allocated to the electric vehicle, a remaining power of the electric vehicle and a power consumption required by a passenger order distance need to be additionally considered. In addition to ensuring that the power is sufficient to complete the order distance, it is also ensured that after the order is completed, there is a sufficient power for the driver to go to a charging point for charging. Further, to cope with a case in which a sudden power consumption is excessively high in a driving process, for example, a traffic jam occurs, or an air conditioner is turned on, after the electric vehicle receives an order and executes a driving task, a driving status of the vehicle also needs to be monitored. An alarm is sent when the electric vehicle may fail to complete the order. In addition, this feature helps the driver to complete the order as much as possible while it is ensured that the power of the vehicle is sufficient for the vehicle to reach the charging point, to improve an order success rate.

Figure 1:
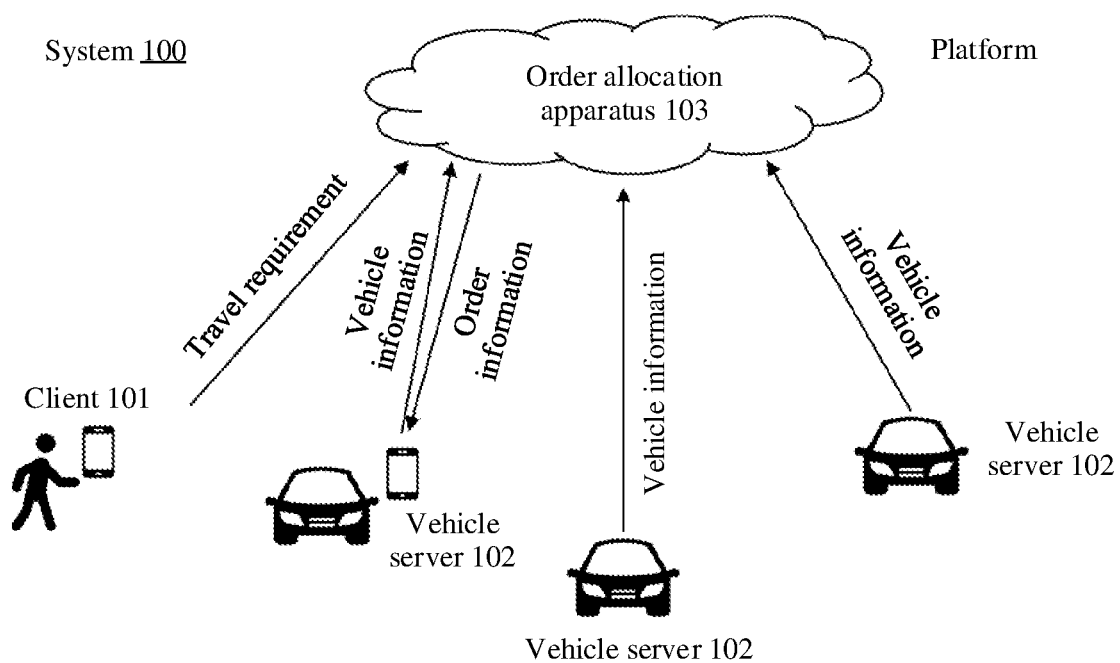
FIG. 1 is a schematic diagram of an application scenario of order allocation according to an embodiment.

FIG. 1 is a schematic diagram of an application scenario of order allocation according to this application. A system 100 includes a client 101, a vehicle server 102, and an order allocation apparatus 103 at a platform. The client 101 sends order request information to the order allocation apparatus 103, and the order request information includes at least a start location and a destination location of a trip of a passenger. The order allocation apparatus 103 collects safe point information of each commercial vehicle and vehicle information reported by the vehicle server 102 of each commercial vehicle. The vehicle server 102 is located on a vehicle that provides an operation service, and the vehicle may be a fossil fuel-powered vehicle or an electric vehicle. When the vehicle is an electric vehicle, in addition to at least vehicle location information, the vehicle information reported by the vehicle server 102 further needs to include a remaining power of the vehicle. The order allocation apparatus 103 may select, based on the order request information and a vehicle location, a candidate vehicle that serves the passenger. When the candidate vehicle is an electric vehicle, a safe driving route is generated for the candidate vehicle. The safe driving route is a route connecting a current location of the candidate vehicle, the start location, the destination location, and a location of a safe point closest to the destination location, and the safe point is a rechargeable point of the electric vehicle. The order allocation apparatus 103 allocates an order to the candidate vehicle after ensuring that a remaining power of the candidate vehicle is sufficient to complete the safe driving route. In the foregoing manner, after completing the order, the electric vehicle still has a sufficient power to reach the rechargeable safe point. This ensures power safety of the electric vehicle after the order is completed.

Based on an existing intelligent order allocation technology, the order allocation apparatus 103 provided in this application may add power information and a constraint on a driving route, to provide power safety assurance for order allocation of the electric vehicle.

The safe point information in this embodiment may be the location of the safe point, or may be information used by the order allocation apparatus to obtain the location of the safe point of each commercial vehicle, for example, a private safe point identifier set by a driver.

Figure 2:
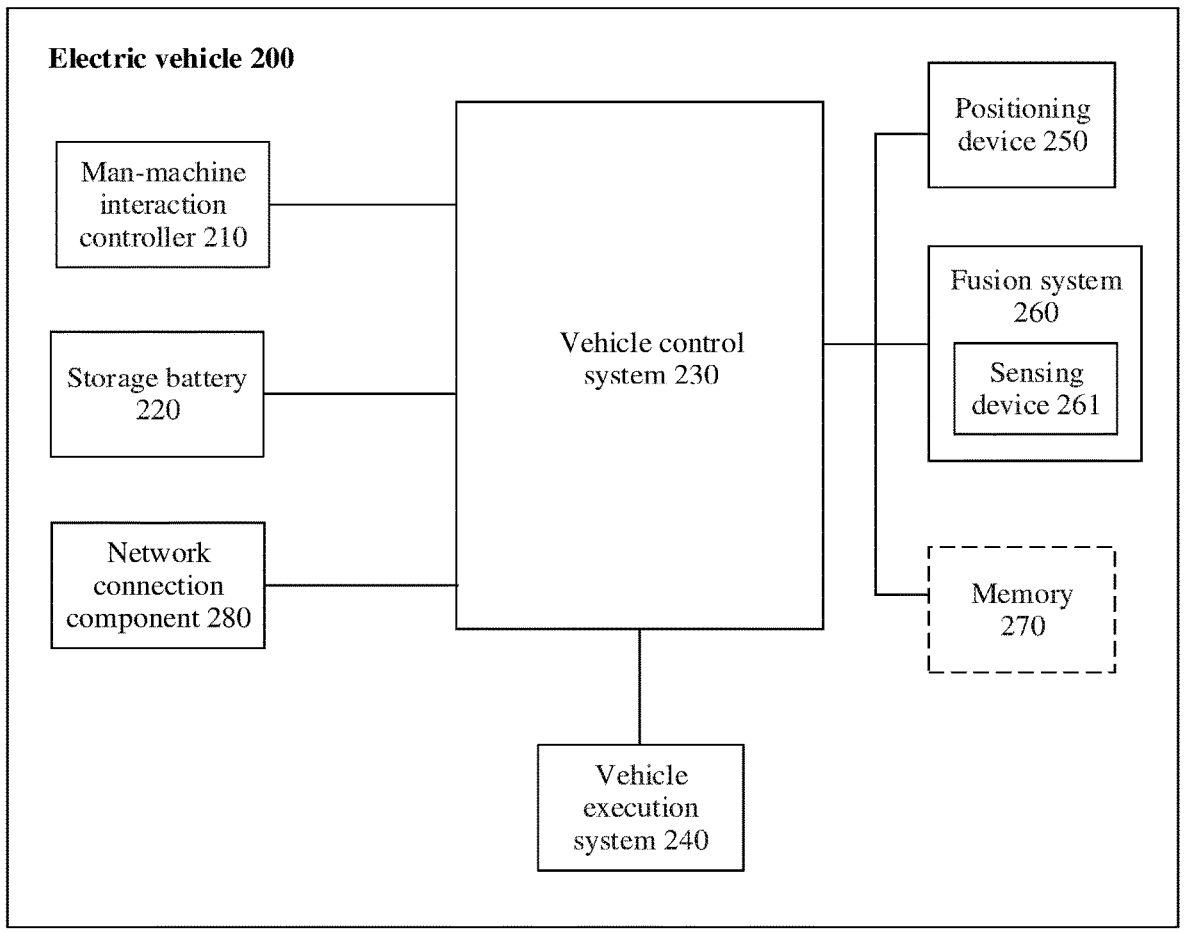
FIG. 2 is a schematic diagram of a logical architecture of an electric vehicle 200 according to an embodiment.

FIG. 2 is a schematic diagram of a logical architecture of an electric vehicle 200 according to this application. The electric vehicle 200 includes a man-machine interaction controller 210, a storage battery 220, a vehicle control system 230, a vehicle execution system 240, a positioning device 250, a fusion system 260, a memory 270, and a network connection component 280.

The man-machine interaction controller 210 is configured to implement message interaction between the electric vehicle and a driver, and the driver may interact with the electric vehicle via the man-machine interaction controller 210. The man-machine interaction controller 210 may display a status of the electric vehicle and various graphic/file messages. The man-machine interaction controller 210 may also receive various operation instructions entered by the driver, and transfer the operation instructions to the vehicle control system 230 for execution.

The storage battery 220 is configured to provide power for the electric vehicle.

The vehicle control system 230 may control the vehicle based on the status of the electric vehicle and input of the driver via the man-machine interaction controller 210. The vehicle control system 230 outputs a control instruction, and controls the electric vehicle via the vehicle execution system 240. The vehicle control system 230 may monitor a status of the storage battery 220, and the status includes a remaining power.

The vehicle control system 230 may obtain and store driving data, a historical driving mileage record, and a historical power consumption record of a user. The vehicle control system 230 may store the obtained data in the memory 270. During specific implementation, the historical power consumption record obtained by the vehicle control system 230 may be expressed in a plurality of forms such as a power value at a moment, an average power consumption per kilometer, and a power change value in a period of time.

During specific implementation, the vehicle control system 230 may be an in-vehicle computing center.

The vehicle execution system 240 includes but is not limited to a device or a subsystem that controls vehicle body traveling, such as a braking system, a steering system, a driving system, or a lighting system.

In a possible implementation, the vehicle control system 230 may include a hardware processing system including one processor or a group of processors.

The positioning device 250 includes a device or a subsystem configured to determine a vehicle location, such as a global positioning system (GPS) or an inertial navigation system (INS). The vehicle control system 230 calculates the vehicle location by using information obtained from the positioning device 250, and reports the vehicle location to the order allocation apparatus 103 at a platform via the network connection component 280.

The fusion system 260 is configured to provide external environment monitoring data for the vehicle control system 230 of the electric vehicle. A sensing device 261 includes a radar, a sensor, a camera, and the like.

Optionally, the electric vehicle 200 may further include the memory 270 configured to store various vehicle-related information. The information includes but is not limited to the driving data, the historical driving mileage record, the historical power record, a map file, and the like of the user. The vehicle controller 230 may obtain the map file from the memory 270, and control a driving route of the electric vehicle with reference to real-time road condition information and electric vehicle power information.

The network connection component 280 is configured to provide the electric vehicle with a network interface for interacting with the outside, so that the electric vehicle can perform information interaction with an external device in a wired or wireless manner. The information interaction may be receiving various messages sent by the platform, sending vehicle status information to the order allocation apparatus 103 or a driver terminal, or the like.

The vehicle control system 230 may further obtain, via the network connection component 280, an order allocation message sent by the order allocation apparatus 103 at the platform, and display a planned safe driving route to the driver via the man-machine interaction controller 210.

It should be noted that the logical architecture of the electric vehicle shown in FIG. 2 is merely an example of the electric vehicle provided in this application. In a specific implementation process, components of the electric vehicle 200 may be added or deleted based on a requirement.

In a possible implementation, the vehicle server 102 may be the vehicle control system 230 shown in FIG. 2.

Figure 3:
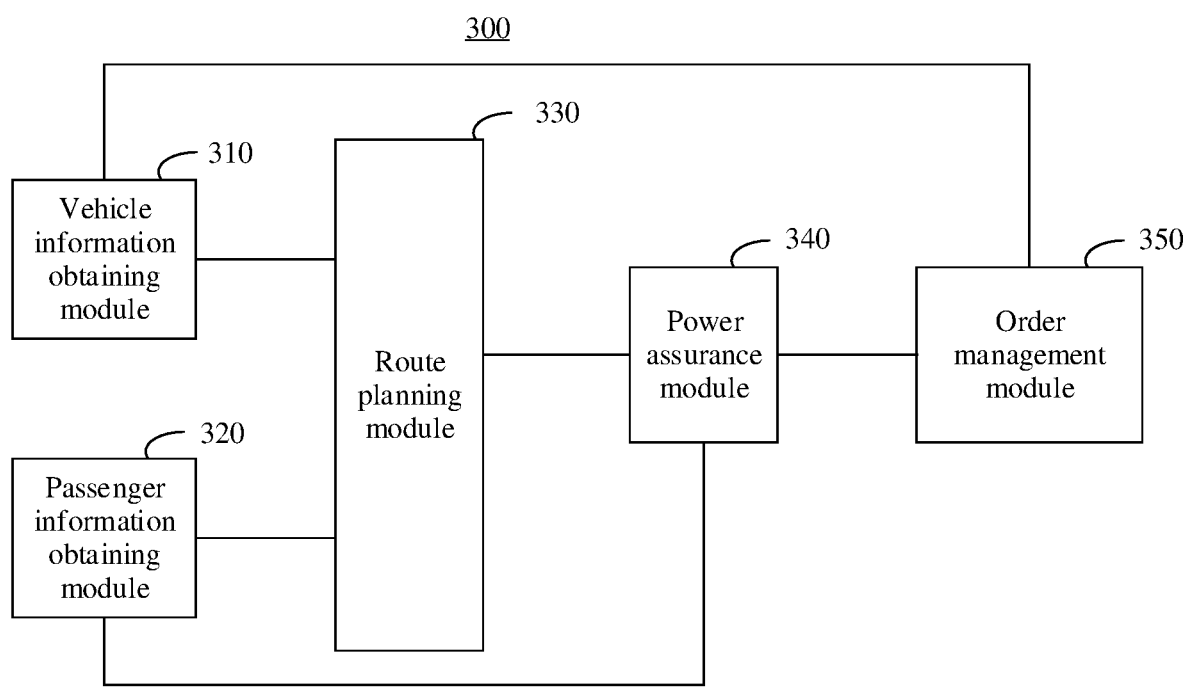
FIG. 3 is a schematic diagram of a logical structure of an order allocation apparatus 300 according to an embodiment.

FIG. 3 is a schematic diagram of a logical structure of an order allocation apparatus 300 according to this application. The order allocation apparatus 300 runs on the platform 103, and is configured to provide order allocation and management functions for commercial vehicles including electric vehicles. The order allocation apparatus 300 may include the following modules.

A vehicle information obtaining module 310 may periodically receive and store vehicle information sent by the vehicle server 102. Specifically, the vehicle information includes a current location of the vehicle, safe point information, a safe power threshold, a remaining power of the vehicle, and the like. The vehicle information may be sent by the vehicle control system 230 of the electric vehicle to the vehicle information obtaining module 310 by using the network connection component 280. Alternatively, the vehicle information may be sent by the vehicle control system 230 to a terminal device of a driver by using the network connection component 280, and the terminal device of the driver sends the vehicle information to the vehicle information obtaining module 310.

It should be noted that a safe point is a charging point. In one aspect, the platform may obtain each charging point that provides a charging service and uses the charging point as the safe point. In another aspect, the driver may also customize the safe point. In this case, the safe point may be a residence of the driver, and there is usually a private electric vehicle charging apparatus at the residence of the driver. The safe point set by the driver may alternatively be another non-public charging point, for example, another private charging point in a residential area. When vehicle information reported by a commercial vehicle does not include a safe point, the order allocation apparatus 300 may obtain a public charging point as the safe point. Alternatively, when vehicle information reported by a commercial vehicle includes a safe point, the order allocation apparatus 300 may further use the safe point set by the driver as a private rechargeable safe point of the driver, and use this safe point with a public safe point as the safe points of the electric vehicle.

The safe power threshold may be a power percentage, or may be a safe power value. For example, the safe power threshold is 20% of a total power, or the safe power value is 10 gigawatt hours. In this embodiment, the safe power value is used as an example for description.

In a specific execution scenario, the vehicle server 102 may be the vehicle control system 230, the terminal device of the driver, or car hailing software on the terminal device. The safe power threshold of the vehicle may be customized by the driver, or may be set by the platform based on a vehicle model of the electric vehicle. The driver may enter safe point information and set a safe power threshold by using the vehicle server 102, and the terminal device of the driver may further use a location of the terminal device of the driver as a current location of the vehicle. When the vehicle server 102 is the terminal device of the driver or the car hailing software on the terminal device, the vehicle control system 230 may send vehicle information to the terminal device of the driver by using the network connection component 280, and the terminal device reports the vehicle information to the vehicle information obtaining module 310.

The vehicle information obtaining module 310 may be further configured to obtain an average power consumption per kilometer of the vehicle. Specifically, the vehicle information obtaining module 310 may calculate the average power consumption per kilometer of the vehicle based on a current location of the vehicle and a current power of the vehicle that are received every one time cycle, and store data about the average power consumption per kilometer in a storage unit (not shown in the figure) of the order allocation apparatus 300. In another possible scenario, the average power consumption per kilometer of the vehicle may alternatively be calculated by the vehicle server 102 based on a driving distance and a historical power consumption record that are obtained through monitoring, and then sent to the vehicle information obtaining module 310.

A passenger information obtaining module 320 receives order request information sent by a passenger by using the client 101. The order request information includes at least a start location and a destination location of the passenger.

A route planning module 330 selects, based on the start location and the destination location of the passenger and a current location of a to-be-selected vehicle on the platform, a vehicle that provides a service. The to-be-selected vehicle may be a vehicle whose distance from the start location of the passenger is less than a distance threshold. The distance threshold may be set, and usually may be set within a few kilometers. If there are no suitable vehicles within a few kilometers, the route planning module 330 may increase the distance threshold. A mapping algorithm of existing car hailing software may be used as a vehicle selection algorithm. This manner can adapt to the existing car hailing software as much as possible, to improve acceptability of the solution.

When a candidate vehicle is an electric vehicle, the route planning module 330 further generates a safe driving route for the candidate vehicle based on the start location of the passenger, a current location of the candidate vehicle, a destination location, and a location of a safe point closest to the destination location.

The route planning module 330 may further search, based on the destination location, for a location of a charging point closest to the destination location.

Further, the route planning module 330 may further refer to a waypoint selected by the driver when generating the safe driving route. The selected waypoint may be a place that the driver needs to pass through along a driving route selected by the driver.

A power assurance module 340 is configured to calculate, based on an average power consumption per kilometer of the candidate vehicle, an estimated power consumption required by the safe driving route, and determine whether a remaining power of the candidate vehicle is sufficient to complete the safe driving route. If a difference obtained by subtracting the estimated power consumption required by the safe driving route from the remaining power of the candidate vehicle is greater than the safe power threshold, it indicates that the remaining power of the candidate vehicle can complete the safe driving route.

Specifically, the power assurance module 340 obtains an average power consumption per kilometer of the candidate vehicle within specific duration or an average power consumption per kilometer corresponding to several time cycles, and uses the obtained average power consumption per kilometer to calculate the estimated power consumption required by the safe driving route.

In a possible implementation, the route planning module 330 may generate two or more safe driving routes for the candidate vehicle. When the remaining power of the candidate vehicle can complete any safe driving route, the order may be allocated to the candidate vehicle. Specifically, the two safe driving routes may be respectively a route to a charging point closest to the destination location and a route to a private safe point set by the driver closest to the destination location. In this case, a first safe driving route may be a route connecting the current location of the vehicle, the start location of the passenger, the destination location, and a location of the charging point closest to the destination, and a second safe driving route may be a route connecting the current location of the vehicle, the start location of the passenger, the destination location, and a location of the private safe point of the driver.

The order management module 350 is further configured to, when the difference obtained by subtracting the estimated power consumption required by the safe driving route from the remaining power of the candidate vehicle is greater than the safe power threshold, send an order allocation message to the candidate vehicle, to notify the candidate vehicle to provide a transport service for the passenger. Further, the order allocation message may carry the safe driving route.

Further, in an order allocation phase, when the power assurance module 340 determines that the remaining power of the candidate vehicle is insufficient to complete the safe driving route, the order management module 350 sends a warning message to the candidate vehicle, and reselects a vehicle that serves the passenger. The warning message indicates that a reason why order allocation fails is that the vehicle has an insufficient power.

After the vehicle server 102 of the candidate vehicle receives the warning message, the driver of the candidate vehicle may learn of the warning message in time, to charge the vehicle. This avoids a case in which the driver cannot receive an order for a long time subsequently because the power of the vehicle is insufficient.

When it is determined that the remaining power of the candidate vehicle cannot complete the safe driving route, the order management module 350 notifies the route planning module 330 to reselect another vehicle for the passenger.

Functions of the modules in the order allocation apparatus are described as function implementation of the modules in the order allocation apparatus 300 in an initial order allocation process.

Further, after a service vehicle starts to execute the order and serve the passenger, the order allocation apparatus 300 further has the following functions.

The order allocation apparatus 300 further provides a monitoring function. In a process in which the service vehicle executes the order, an order completion status is continuously monitored, and a remaining power and a location of the service vehicle are tracked, to ensure that a power of the service vehicle can complete the order, or in a worst case, to ensure that the service vehicle can reach a safe point as much as possible.

Specifically, the vehicle information obtaining module 310 may periodically receive vehicle information sent by the vehicle server 102 of the service vehicle. The vehicle information includes the location information and the remaining power of the vehicle.

The power assurance module 340 determines whether a remaining safe driving route can be completed by using the remaining power of the service vehicle. If a difference obtained by subtracting an estimated power consumption required by the remaining safe driving route from the current remaining power of the service vehicle is less than the safe power threshold, it indicates that the remaining safe driving route cannot be completed by using the remaining power of the service vehicle. In this case, the route planning module 330 determines a location of a safe point closest to a current location of the service vehicle, and generates a safe alternative route for the service vehicle. The safe alternative route is a route connecting the current location of the service vehicle and the location of the closest safe point. The power assurance module 340 further determines whether a difference obtained by subtracting an estimated power consumption required by the safe alternative route from the current remaining power of the service vehicle is greater than the safe power threshold. If yes, the service vehicle continues to execute the order. The vehicle information obtaining module 310 continues to monitor the remaining power and the location of the service vehicle. In a process in which the service vehicle continues to execute the order, the power assurance module 340 continuously tracks the remaining power of the service vehicle, periodically calculates whether a difference obtained by subtracting an estimated power consumption required by a refreshed safe alternative route from a remaining power of the service vehicle is greater than the safe power threshold, and if yes, continues monitoring, until the order is completed. If determining that a difference obtained by subtracting an estimated power consumption required by the safe alternative route from the current remaining power of the service vehicle is less than the safe power threshold, the power assurance module 340 notifies the order management module 350 to send the safe alternative route to the service vehicle, and notifies the service vehicle to terminate the order and go to the safe point for charging according to the safe alternative route. In this case, the route planning module 330 may select another vehicle for the passenger, and notify the newly selected another vehicle of a location of the foregoing service vehicle, so that the other vehicle continues to complete the order and delivers the passenger to the destination location.

The power supply assurance module 340 may be configured to process power-related calculation, including calculation of an estimated power consumption required by a remaining safe driving route, calculation of an estimated power consumption required by a safe alternative route, and the like. Specifically, the power supply assurance module 340 calculates an estimated power consumption required by a route based on an average power consumption per kilometer of the service vehicle and a distance of the route.

Further, the order management module 350 is further configured to, when it is determined that the difference obtained by subtracting the estimated power consumption required by the safe alternative route from the current remaining power of the service vehicle is greater than the safe power threshold, send a power save notification to the service vehicle.

Similar to the foregoing safe driving route, in a possible implementation scenario, there may also be two or more safe alternative routes. For example, a first safe alternative route may be a route from the current location of the service vehicle to a location of a charging point closest to the current location of the service vehicle, and a second safe alternative route may be a route from the current location of the service vehicle to a location of a private safe point of the driver closest to the current location of the service vehicle.

Figure 4:
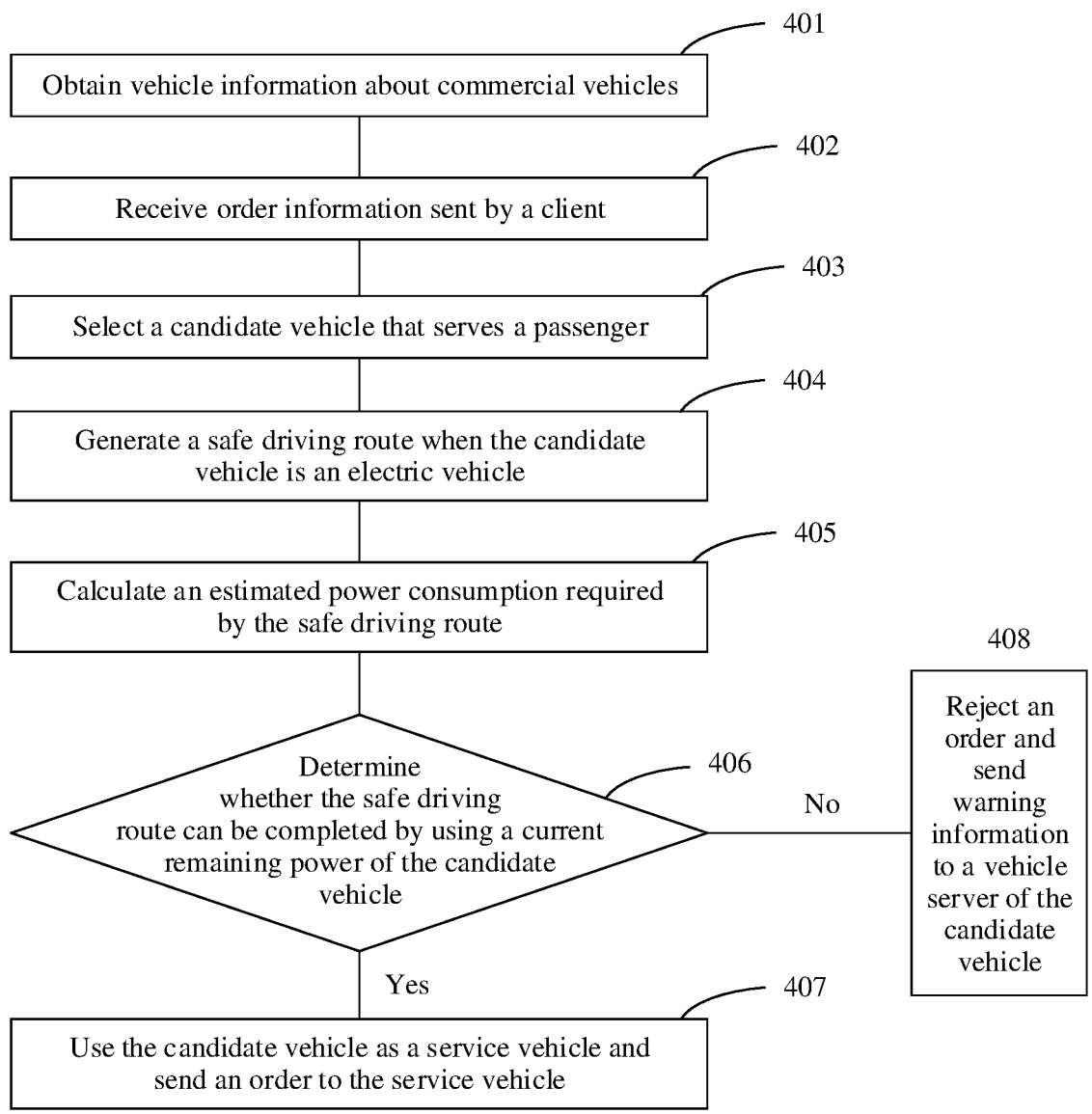
FIG. 4 is a schematic flowchart of an order allocation method applied to an electric vehicle according to an embodiment.

Based on the functions of the components of the order allocation apparatus described in the foregoing embodiments, FIG. 4 is a schematic flowchart of an order allocation method applied to an electric vehicle according to this application. The method is executed by the order allocation apparatus at the platform, and includes the following steps.

Step 401: The order allocation apparatus obtains, every one time cycle, vehicle information about a commercial vehicle registered on a platform. When the commercial vehicle is the electric vehicle, the vehicle information includes a current location of the vehicle, a location of a safe point, a safe power threshold, a current remaining power of the vehicle, and an average power consumption per kilometer of the vehicle.

In a specific implementation scenario, as described in the foregoing embodiments, the location of the safe point, the safe power threshold, and the average power consumption per kilometer of the vehicle may not be included in the vehicle information reported by the vehicle, but be obtained by the order allocation apparatus by using the method described in the foregoing embodiments.

For example, the order allocation apparatus may receive the average power consumption per kilometer sent by the vehicle, or may calculate the average power consumption per kilometer of the vehicle based on a historical driving distance and a historical power consumption record that are recorded in a storage unit.

For example, the average power consumption per kilometer may be calculated by using the following formula:

$$\overline{s}_n = \frac{q_{n-1} - q_n}{|d_n - d_{n-1}|},$$

where $\overline{s}$ represents an average power consumption per kilometer, n represents an $n^{th}$ time cycle, $|d_n-d_{n-1}|$ represents a distance driven by the vehicle in the $n^{th}$ time cycle, and $q_n$ represents a remaining power of the vehicle at the end of the $n^{th}$ time cycle.

Step 402: The order allocation apparatus receives, at a current moment $t_n$, order request information sent by a client of a passenger. The order request information includes a start location and a destination location of the passenger.

Step 403: A candidate vehicle is determined based on the start location and the destination location of the passenger, and a current location of a to-be-selected vehicle on the platform. A mapping algorithm for determining the candidate vehicle may be a matching technology of existing car hailing software, for example, a mapping algorithm of car hailing software such as Uber, Lift, or DiDi.

Step 404: When the candidate vehicle is the electric vehicle, a safe driving route is generated for the candidate vehicle. The safe driving route is a route connecting a current location of the candidate vehicle, the start location, the destination location, and a location of a safe point closest to the destination location.

There may be one or more safe driving routes.

When there are two or more safe driving routes, the safe driving routes may include, for example, a first safe route and a second safe route. The first safe route is a route connecting the current location of the candidate vehicle, the start location of the passenger, the destination location, and a location of a charging point closest to the destination. The second safe route is a route connecting the current location of the candidate vehicle, the start location of the passenger, the destination location, and a location of a private safe point set by a driver.

Step 405: An estimated power consumption required by the safe driving route is calculated.

For example, when the safe driving route includes the first safe route and the second safe route, an estimated power consumption of the first safe route and an estimated power consumption of the second safe route may be separately calculated based on an average power consumption per kilometer in a previous time cycle (or several time cycles).

A calculation method may use the following formula:

$$q=(m_n\overline{s}_n+m_{n-1}\overline{s}_{n-1}+m_{n-2}\overline{s}_{n-2}+ \ldots ) \times d,$$

where q represents an estimated power consumption required by a selected driving route, $\overline{s}_n$ represents an average power consumption per kilometer in a time cycle prior to a current moment $t_n$, and $m_n$ represents a weight of the power consumption per kilometer in the time cycle prior to the current moment $t_n$, where $m_n+m_{n-1}+m_{n-2}+ \ldots =1$. Because a driving environment in the time cycle prior to the current moment is most similar to that at the current moment, a value of $m_n$ shall remain the maximum. d represents a total distance of the selected driving route.

Step 406: Whether a current remaining power of the selected vehicle is sufficient to complete the safe driving route is determined. If yes, step 407 is performed, to determine the candidate vehicle as a service vehicle of the passenger, and send an order allocation message to the service vehicle. If no, step 408 is performed.

For example, when a difference obtained by subtracting the estimated power consumption required by the safe driving route from the current remaining power of the candidate vehicle is greater than the safe power threshold, it is determined that the current remaining power of the candidate vehicle can complete the safe route.

When the safe driving route includes the first safe driving route and the second safe driving route, when the current remaining power of the candidate vehicle can complete one of the safe driving routes, it may be determined that the current remaining power of the candidate vehicle can complete the safe route.

Specifically, if a difference obtained by subtracting an estimated power consumption required by the first safe driving route from the current remaining power of the candidate vehicle is greater than the safe power threshold of the candidate vehicle, and a difference obtained by subtracting an estimated power consumption required by the second safe driving route from the current remaining power of the candidate vehicle is also greater than the safe power threshold of the candidate vehicle, step 407 is performed, the candidate vehicle is used as the service vehicle of the passenger, and an order is sent to the service vehicle.

If a difference obtained by subtracting an estimated power consumption required by one of the safe driving routes from the current remaining power of the candidate vehicle is greater than the safe power threshold of the candidate vehicle, and a difference obtained by subtracting an estimated power consumption required by the other safe driving route from the current remaining power of the candidate vehicle is less than the safe power threshold of the candidate vehicle, step 407 is performed, the order is sent to the service vehicle, and the candidate vehicle is notified that there is a safe driving route that cannot be completed, so that a driver of the candidate vehicle can pay attention to a power status.

If the difference obtained by subtracting the estimated power consumption required by the first safe driving route from the current remaining power of the candidate vehicle is less than the safe power threshold of the candidate vehicle, and the difference obtained by subtracting the estimated power consumption required by the second safe driving route from the current remaining power of the candidate vehicle is also less than the safe power threshold of the candidate vehicle, step 408 is performed, a warning message is sent to the candidate vehicle, and the candidate vehicle is canceled. The warning message indicates that a reason why order allocation fails is that the vehicle has an insufficient power. Further, the order allocation apparatus selects another vehicle to provide a transport service for the passenger.

Figure 5:
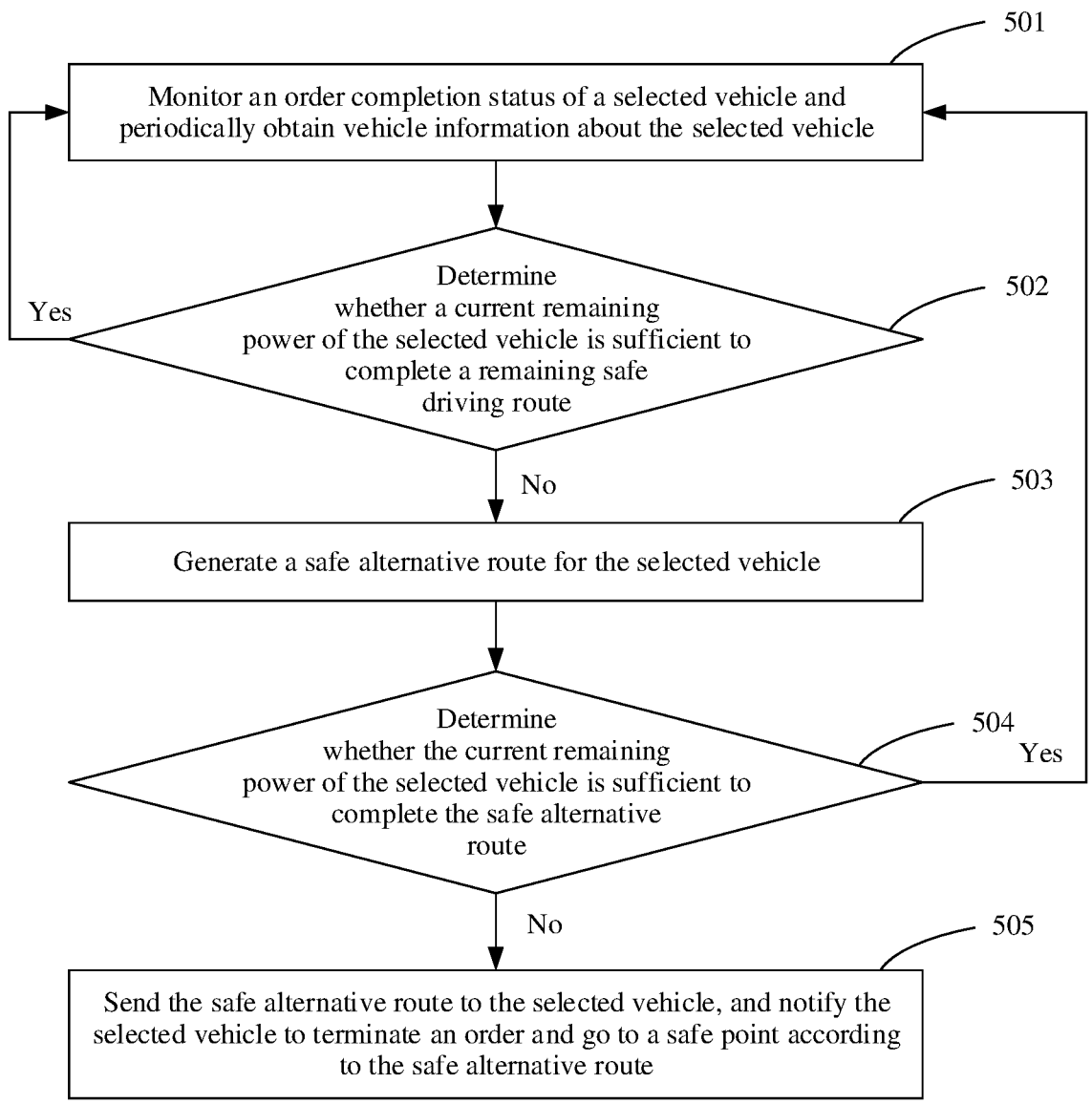
FIG. 5 is a schematic flowchart of an order monitoring method applied to an electric vehicle according to an embodiment.

After the order is allocated, the order allocation apparatus may further execute a monitoring function to monitor a status of the order. Specifically, to avoid a problem that a remaining power is insufficient to complete an order due to an excessively high power consumption caused by some special cases (for example, a traffic jam occurs or an air conditioner is temporarily turned on) in an order completion process, in this application, the service vehicle continues to be monitored after an initial order allocation function is completed. FIG. 5 is a schematic flowchart of an order monitoring method applied to an electric vehicle according to this application. The method includes the following steps.

Step 501: The order allocation apparatus periodically obtains vehicle information, including a current location of the vehicle and a current remaining power of the vehicle, of the service vehicle every one time cycle, to calculate an estimated power consumption required by a remaining safe driving route.

When a safe driving route includes a first safe driving route and a second safe driving route, a power consumption of a remaining route of the first safe driving route and a power consumption of a remaining route of the second safe driving route are separately calculated.

Step 502: The order allocation apparatus determines whether the current remaining power of the service vehicle is sufficient to complete the remaining safe driving route.

Specifically, the order allocation apparatus determines whether a difference obtained by subtracting the estimated power consumption required by the remaining safe driving route from the current remaining power of the service vehicle is greater than the safe power threshold. If yes, it indicates that the current remaining power of the service vehicle is sufficient to complete the remaining safe driving route. In this case, information indicating that the order can be normally completed may be sent to the platform or the vehicle server, and step 501 continues to be performed to keep monitoring until the order is completed. If no, it indicates that the safe driving route cannot be completed by using the current remaining power of the service vehicle, and there is a risk. In this case, step 503 is performed subsequently.

Specifically, when the safe driving route includes the first safe driving route and the second safe driving route, any safe driving route can be completed by using the remaining power of the service vehicle. However, if a difference obtained by subtracting an estimated power consumption of the remaining route of the first safe driving route from the current remaining power of the service vehicle is less than the safe power threshold of the service vehicle, and a difference obtained by subtracting an estimated power consumption of the remaining route of the second safe driving route from the current remaining power of the service vehicle is also less than the safe power threshold of the service vehicle, it indicates that the current order cannot be completed, and in this case, step 503 is performed.

Step 503: The order allocation apparatus determines a location of a safe point closest to the current location of the service vehicle, and generates a safe alternative route for the service vehicle.

Similar to the foregoing embodiment, for example, there may be one or more safe alternative routes. The safe alternative route may include a first safe alternative route and a second safe alternative route. The first safe alternative route may be a route connecting the current location of the vehicle and a location of a charging point closest to the current location of the vehicle. The second safe alternative route may be a route connecting the current location of the service vehicle and a location of a private safe point set by a driver. When there are a plurality of private safe points, the private safe point on the second alternative route may be a private safe point closest to the current location of the service vehicle.

Step 504: The order allocation apparatus determines whether the current remaining power of the service vehicle is sufficient to complete the safe alternative route. Specifically, the order allocation apparatus determines whether a difference obtained by subtracting an estimated power consumption required by the safe alternative route from the current remaining power of the service vehicle is greater than the safe power threshold. If yes, it indicates that the safe alternative route can be completed by using the current remaining power of the service vehicle, and in this case, the service vehicle continues to execute the order, and step 501 continues to be performed to monitor the remaining power and the location of the service vehicle. If no, step 505 is performed.

Specifically, when there are two or more safe alternative routes, any safe alternative route can be completed by using the current remaining power of the service vehicle. When a difference obtained by subtracting an estimated power consumption required by any safe alternative route from the current remaining power of the service vehicle is less than the safe power threshold, step 505 is performed. The first safe alternative route may be a route from the current location of the service vehicle to a location of a charging point closest to the current location of the service vehicle, and the second safe alternative route may be a route from the current location of the service vehicle to a location of a private safe point of the driver closest to the current location of the service vehicle.

If a difference obtained by subtracting an estimated power consumption required by a remaining route of the first safe alternative route from the current remaining power of the service vehicle is less than the safe power threshold of the service vehicle, and a difference obtained by subtracting an estimated power consumption required by a remaining route of the second safe alternative route from the current remaining power of the service vehicle is also less than the safe power threshold of the service vehicle, it indicates that the current order cannot be completed, there is a risk that the driver cannot safely go to a safe point, this risk is unacceptable, and the order needs to be terminated immediately. In this case, an insufficient power warning is sent to the vehicle server, to notify the driver to go to a rechargeable safe point. The warning message may carry a safe alternative route.

If a difference obtained by subtracting an estimated power consumption required by a remaining route of any safe alternative route from the current remaining power of the service vehicle is greater than the safe power threshold of the service vehicle, it indicates that the current order may not be completed, but it can be ensured that the vehicle has a sufficient power, and the driver may give up the order at any time and go to a rechargeable safe point. In this case, the driver may continue to complete the current order. Go to step 501, to continue to monitor a completion status of the safe driving route. On this basis, the order allocation apparatus may notify the driver to take appropriate measures to reduce the power consumption. After the driver takes an appropriate measure, the remaining power of the vehicle may be sufficient to complete the safe driving route. In this case, order rescue succeeds. When the remaining safe driving route cannot be completed by using the remaining power of the vehicle, as long as it is ensured that the safe alternative route can be completed by using the remaining power of the vehicle, and the service vehicle has a sufficient power to go to a rechargeable safe point, the order may continue to be executed, to try to rescue the order. When the safe driving route cannot be completed by using the remaining power of the vehicle, and the safe alternative route also cannot be completed by using the remaining power of the vehicle, it indicates that order rescue fails. Step 505 is performed.

Step 505: The order allocation apparatus sends the safe alternative route to the service vehicle, to notify the service vehicle to terminate the order and go to a safe point for charging according to the safe alternative route.

After the order is terminated, the order allocation apparatus may select another vehicle to continue to serve the passenger.

In one aspect, in this embodiment of this application, the safe driving route is generated comprehensively by considering not only the start location and the destination location of the order, but also the current location of the vehicle and the location of the rechargeable safe point after the order is completed, to ensure power safety after the driver completes the order.

In another aspect, in this application, in addition to considering a power consumption based on a driving route distance, factors such as different basic power consumptions of different vehicles, a driving environment, and a driving habit are further considered. This improves calculation accuracy of the power consumption. Specifically, in this application, the estimated power consumption of the service vehicle for completing the driving route is purposefully calculated based on information about a historical average power consumption per kilometer of the vehicle, so that an estimation result of the power consumption is more accurate.

In another aspect, if the vehicle cannot complete the remaining safe driving route, the vehicle gives up the order and goes to the charging point. As a result, many orders that can be completed originally after the driver takes some power saving measures are given up, and consequently, an order completion rate of the driver is reduced, and bad impact on passenger experience is caused. In this application, after it is found that a remaining safe driving route may not be completed, a safe alternative route is defined. If the service vehicle has a sufficient remaining power to complete the safe alternative route and go to a safe point for charging (for example, a difference obtained by subtracting the estimated power consumption required by the safe alternative route from the current remaining power of the service vehicle is greater than the safe power threshold), it can be ensured that the driver can go to the safe point for charging at any time. Therefore, the service vehicle is maintained to continue to execute the order, to complete the order as much as possible. This improves an order completion rate of the driver. In addition, when the current remaining power of the service vehicle is insufficient to complete the safe alternative route (for example, a difference obtained by subtracting the estimated power consumption required by the safe alternative route from the current remaining power of the service vehicle is less than the safe power threshold), it indicates that there is a risk that the service vehicle reaches, by using the remaining power of the service vehicle, the safe point for charging. In this case, the order is terminated, and a current location of the vehicle is a location of a point that is closest to the destination of the order and that the vehicle can reach, which brings convenience to the passenger in the vehicle and ensures that the vehicle can go to a rechargeable safe point as soon as possible by using a redundant power of the safe power threshold.

In a calculation method for power consumption estimation, information about an average power consumption per kilometer of a vehicle may be periodically collected every one time cycle, and information about a historical average power consumption is used to make power consumption estimation more accurate.

In the foregoing implementation, the order allocation apparatus may first select the candidate vehicle, then determine whether the remaining power of the candidate vehicle is sufficient to complete the safe driving route, and if yes, determine the candidate vehicle as the service vehicle of the passenger. In another implementation, the order allocation unit may directly select the service vehicle for the passenger based on the location information and the remaining power of the commercial vehicle, the travel information of the passenger, and the safe point information, and ensures that when the service vehicle is an electric vehicle, the remaining power of the service vehicle is sufficient to complete the safe driving route. The safe driving route is a route connecting the current location of the candidate vehicle, the start location, the destination location, and the location of the safe point closest to the destination location.

It should be noted that the method for allocating an order to an electric vehicle provided in this application may be applied to a car hailing software platform, or may be applied to a vehicle server.

The vehicle server sends vehicle information to an order allocation apparatus at a platform. The vehicle information includes a current location and a remaining power of a vehicle. The vehicle server receives an order allocation message sent by the order allocation apparatus. The order allocation message carries a start location and a destination location of a passenger. The vehicle server receives an order when determining that the remaining power of the vehicle is sufficient to complete a safe driving route, and provides a transport service for the passenger. The safe driving route is a route connecting the current location of the vehicle, the start location of the passenger, the destination location of the passenger, and a location of a safe point closest to the destination location, and the safe point is a charging point of the electric vehicle.

When determining that the remaining power of the vehicle is sufficient to complete the safe driving route, the vehicle server receives the order to provide the transport service for the passenger.

The vehicle server continuously monitors the remaining power and the location of the vehicle in a process of providing the transport service for the passenger. When determining that a current remaining power of the vehicle is insufficient to complete a remaining safe driving route, the vehicle server determines a location of a safe point closest to a current location of the vehicle, and generates a safe alternative route. The safe alternative route is a route connecting the current location of the vehicle and the location of the closest safe point. When determining that the current remaining power of the vehicle is sufficient to complete the safe alternative route, the vehicle server continues to execute the order and monitor the remaining power and the location of the vehicle.

When determining that the current remaining power of the vehicle is insufficient to complete the safe alternative route (for example, a difference obtained by subtracting an estimated power consumption required by the safe alternative route from the current remaining power of the vehicle is less than a safe power threshold), the vehicle server terminates the order, and displays indication information to indicate a driver to go to the safe point according to the safe alternative route.

When receiving the order allocation message sent by the order allocation apparatus, when determining that the remaining power of the vehicle is insufficient to complete the safe driving route (for example, a difference obtained by subtracting an estimated power consumption required by the safe driving route from the remaining power of the vehicle is less than the safe power threshold), the vehicle server returns an order rejection message to the order allocation apparatus, and displays warning information. The warning message indicates that a reason why order allocation fails is that the vehicle has an insufficient power.

The vehicle server calculates an average power consumption per kilometer of the vehicle based on a historical driving mileage record and a historical power consumption record of the vehicle. The vehicle server calculates, based on the average power consumption per kilometer of the vehicle, an estimated power consumption required by the safe driving route.

It should be noted that a main difference between an order management method performed by the vehicle server and an order management method performed by the order allocation apparatus on the platform lies in that initial allocation of an order is performed by the order allocation apparatus, and the vehicle server may execute the functions described in the foregoing method. Further, the vehicle server may use a method similar to that of the order allocation apparatus, to calculate whether the safe driving route can be completed by using the remaining power of the vehicle, calculate whether the safe alternative route can be completed by using the remaining power of the vehicle, and calculate various estimated power consumptions. A specific calculation manner is similar to that in the foregoing embodiment corresponding to FIG. 3 to FIG. 5, and similar beneficial effects can be implemented. Details are not described again in this application.

Figure 6:
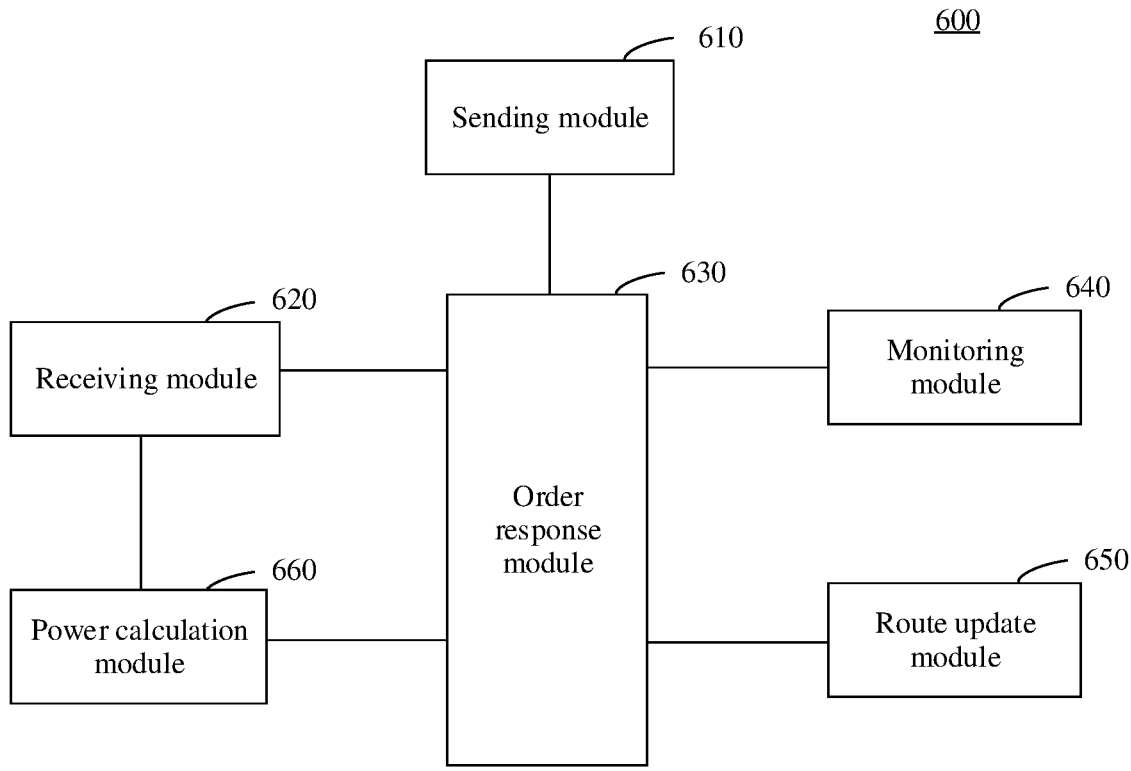
FIG. 6 is a schematic diagram of a logical structure of a vehicle server device 600 according to an embodiment.

FIG. 6 is a schematic diagram of a logical structure of a vehicle server device 600 according to this application. The vehicle server device 600 includes a sending module 610, a receiving module 620, an order response module 630, a monitoring module 640, a route update module 650, and a power calculation module 660.

The sending module 610 is configured to send vehicle information to an order allocation apparatus at a platform. The vehicle information includes a current location and a remaining power of a vehicle.

The receiving module 620 is configured to receive an order allocation message sent by the order allocation apparatus. The order allocation message carries a start location and a destination location of a passenger.

The order response module 630 is configured to, when it is determined that the remaining power of the vehicle is sufficient to complete a safe driving route, receive an order, and provide a transport service for the passenger. The safe driving route is a route connecting the current location of the vehicle, the start location of the passenger, the destination location of the passenger, and a location of a safe point closest to the destination location, and the safe point is a charging point of an electric vehicle.

Further, the monitoring module 640 is configured to continuously monitor the remaining power and the location of the vehicle in a process of providing the transport service for the passenger.

The route update module 650 is configured to, when it is determined that the current remaining power of the vehicle is insufficient to complete a remaining safe driving route, determine a location of a safe point closest to the current location of the vehicle, and generate a safe alternative route. The safe alternative route is a route connecting the current location of the vehicle and the location of the closest safe point.

The monitoring module 64 is further configured to, when it is determined that the current remaining power of the vehicle is sufficient to complete the safe alternative route, continue to execute the order and continue to monitor the remaining power and the location of the vehicle.

The order response module 630 is further configured to, when it is determined that the current remaining power of the vehicle is insufficient to complete the safe alternative route, terminate the order, and display indication information to indicate the driver to go to the safe point according to the safe alternative route.

The order response module 630 is further configured to, when it is determined that the remaining power of the vehicle is insufficient to complete the safe driving route, return an order rejection message to the order allocation apparatus by using the sending module 610, and display warning information. The warning message indicates that a reason why order allocation fails is that the vehicle has an insufficient power.

The power calculation module 660 is configured to calculate an average power consumption per kilometer of the vehicle based on a historical driving mileage record and a historical power consumption record of the vehicle, and calculate, based on the average power consumption per kilometer of the vehicle, an estimated power consumption required by the safe driving route.

Figure 7:
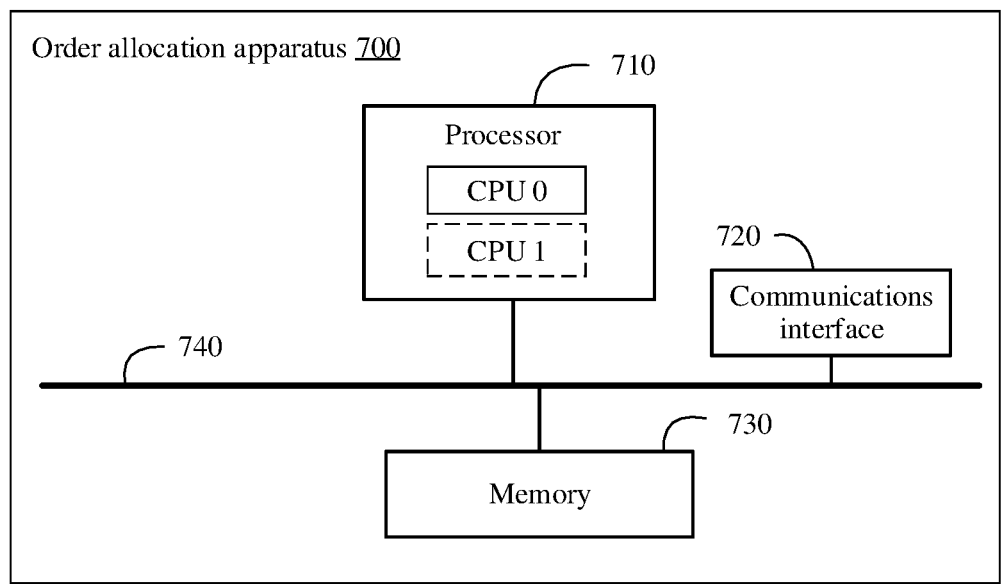
FIG. 7 is a schematic diagram of a hardware structure of an order allocation apparatus 700 according to an embodiment.

FIG. 7 is a schematic diagram of a hardware structure of an order allocation apparatus 700 according to this application. The order allocation apparatus 700 is configured to implement the functions of the order allocation apparatus described in the foregoing embodiments in FIG. 1 to FIG. 5. The order allocation apparatus 700 includes a processor 710, a communications interface 720, and a memory 730. The processor 710, the communications interface 720, and the memory 730 are connected to each other through a bus 740.

For specific implementations of performing various operations by the processor 710, refer to the descriptions of the embodiments in FIG. 1 to FIG. 5, for example, obtaining vehicle information and order request information of a passenger, selecting a vehicle, generating a safe driving route and a safe alternative route, and calculating an estimated power. The processor 710 may have a plurality of specific implementation forms. The processor 710 performs a related operation based on a program unit stored in the memory. The program unit may be an instruction, or referred to as a computer program. The processor 710 may be a central processing unit (cCPU) or a graphics processing unit (GPU). The processor 710 may alternatively be a single-core processor or a multi-core processor.

The processor 710 may be a combination of a CPU and a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The communications interface 720 may be a wired interface or a wireless interface, and is configured to communicate with another module or device. The wired interface may be an Ethernet interface, a controller area network (CAN) interface, a local interconnect network (LIN) interface, or a FlexRay interface. The wireless interface may be a cellular network interface, a wireless local area network interface, or the like. For example, the communications interface 720 in this embodiment of this application may be specifically configured to receive environmental data collected by a sensor.

The bus 740 may be a CAN bus or another internal bus that implements interconnection between systems or devices in a vehicle. The bus 740 may be classified into an address bus, a data bus, a control bus, and the like. For ease of representation, only one thick line is used to represent the bus in FIG. 7, but this does not mean that there is only one bus or only one type of bus.

The order allocation apparatus 700 may further include the memory 730. A storage medium of the memory 730 may be a volatile memory and a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. For example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). The memory 730 may also be configured to store program code and data, so that the processor 710 invokes the program code stored in the memory 730, to execute the functions of the foregoing order allocation apparatus. In addition, the order allocation apparatus 700 may include more or fewer components than those shown in FIG. 7, or may have a different component configuration.

Figure 8:
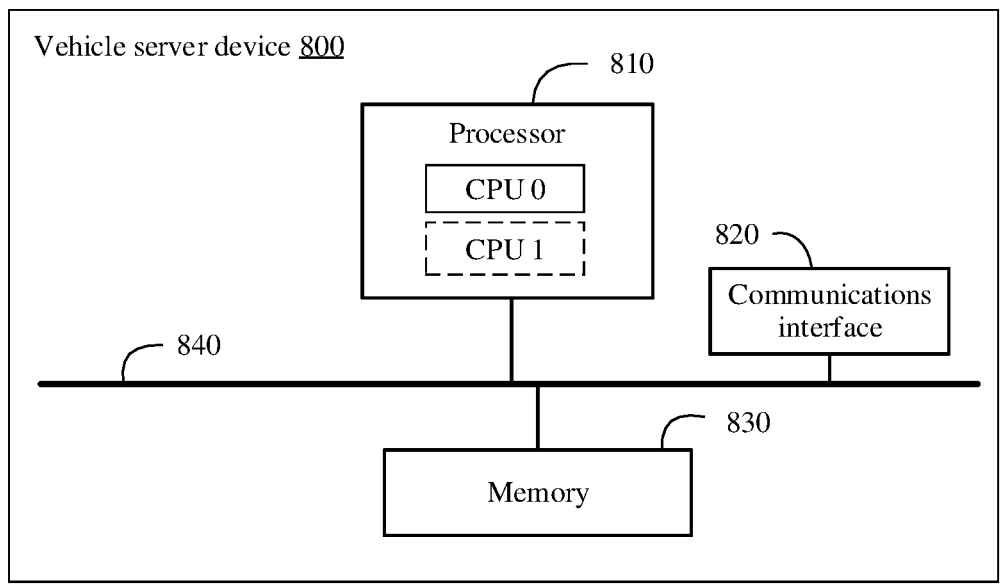
FIG. 8 is a schematic diagram of a hardware structure of a vehicle server device 800 according to an embodiment.

FIG. 8 is a schematic diagram of a hardware structure of a vehicle server device 800 according to this application. The vehicle server device 800 is configured to implement the functions of the vehicle server described in the foregoing embodiment related to FIG. 6. The vehicle server device 800 includes a processor 81o, a communications interface 820, and a memory 830. The processor 81o, the communications interface 820, and the memory 830 are connected to each other through a bus 840.

A specific hardware implementation of components shown in FIG. 8 is similar to that in FIG. 7. Details are not described again in this application. When the processor 81o executes instructions stored in the memory 830, the vehicle server device 800 executes the functions of the vehicle server described in the foregoing embodiment related to FIG. 6.

In the foregoing embodiments, the description of each embodiment has respective focuses. For a part that is not described in detail in an embodiment, refer to related descriptions in other embodiments.

A sequence of the steps of the method in embodiments of this application may be adjusted, combined, or deleted based on an actual requirement. The modules in the apparatus in embodiments of this application may be divided, combined, or deleted based on an actual requirement.

The embodiments of this application are described in detail above. The principle and implementation of this application are described herein through specific examples. The description about embodiments of this application is provided to help understand the method and core ideas of this application, but it does not indicate that this application is merely limited to content descriptions in the foregoing specific examples.

What is claimed is:

1. An order management method applied to an electric vehicle, comprising:
    obtaining, by an order allocation apparatus, vehicle information about a plurality of commercial vehicles and safe point information, wherein the commercial vehicles comprise the electric vehicle, wherein vehicle information about the electric vehicle comprises a current location and a remaining power of the vehicle, wherein safe point information indicates a safe point, and wherein a safe point is a charging point of the electric vehicle;
    receiving, by the order allocation apparatus, order request information sent by a user, wherein the order request information comprises a start location and a destination location;
    selecting, by the order allocation apparatus, a candidate vehicle from the plurality of commercial vehicles;
    generating, by the order allocation apparatus, based on the candidate vehicle being the electric vehicle, a safe driving route for the candidate vehicle, wherein the safe driving route is a route connecting a current location of the candidate vehicle, the start location, the destination location, and a location of a safe point closest to the destination location; and
    sending, by the order allocation apparatus, based on determining a remaining power of the candidate vehicle is sufficient to complete the safe driving route, an order allocation message to the candidate vehicle notifying the candidate vehicle as a service vehicle of the user.

2. The method according to claim 1, further comprising:
    continuously monitoring, by the order allocation apparatus, a remaining power and a location of the service vehicle while the service vehicle provides a transport service for the user;
    determining, by the order allocation apparatus, based on determining a current remaining power of the service vehicle is insufficient to complete a remaining safe driving route, a location of a safe point closest to a current location of the service vehicle;
    generating a safe alternative route for the service vehicle, wherein the safe alternative route is a route connecting the current location of the service vehicle and the location of the closest safe point; and
    continuing, by the order allocation apparatus, based on determining the current remaining power of the service vehicle is sufficient to complete the safe alternative route, to monitor the remaining power and the location of the service vehicle.

3. The method according to claim 2, wherein, if it is determined that the current remaining power of the service vehicle is sufficient to complete the safe alternative route, the method further comprises:
    sending, by the order allocation apparatus, a power saving notification to the service vehicle.

4. The method according to claim 2, further comprising:
    notifying, by the order allocation apparatus, based on determining the current remaining power of the service vehicle is insufficient to complete the safe alternative route, the service vehicle to terminate an order and go to the safe point according to the safe alternative route.

5. The method according to claim 1, further comprising:
    sending, by the order allocation apparatus, based on determining the remaining power of the candidate vehicle is insufficient to complete the safe driving route, a warning message to the candidate vehicle, and canceling the candidate vehicle, wherein the warning message indicates that a reason why order allocation fails is that the vehicle has an insufficient power.

6. The method according to claim 1, further comprising:
    calculating, by the order allocation apparatus, an average power consumption per kilometer of the service vehicle based on a historical driving mileage record and a historical power consumption record of the service vehicle; and calculating, by the order allocation apparatus based on the average power consumption per kilometer of the service vehicle, an estimated power consumption required by the safe driving route.

7. An order management method applied to an electric vehicle, comprising:
   sending, by a vehicle server, commercial vehicle information to an order allocation apparatus, wherein the commercial vehicle information comprises a current location and a remaining power of a vehicle;
   receiving, by the vehicle server, an order allocation message sent by the order allocation apparatus, wherein the order allocation message carries a start location and a destination location of a user; and
   receiving, by the vehicle server, based on determining the remaining power of the commercial vehicle is sufficient to complete a safe driving route, an order for providing a transport service for the user by the commercial vehicle, wherein the safe driving route is a route connecting the current location of the commercial vehicle, the start location of the user, the destination location of the user, and a location of a safe point closest to the destination location, and wherein the safe point is a charging point of an electric vehicle.

8. The method according to claim 7, further comprising:
   continuously monitoring, by the vehicle server, the remaining power and the location of the commercial vehicle in a process of providing the transport service for the user;
   determining, by the vehicle server, based on determining a current remaining power of the commercial vehicle is insufficient to complete a remaining safe driving route, a location of a safe point closest to the current location of the commercial vehicle;
   generating, by the vehicle server, a safe alternative route, wherein the safe alternative route is a route connecting the current location of the commercial vehicle and the location of the closest safe point; and
   continuing, by the vehicle server, based on determining the current remaining power of the commercial vehicle is sufficient to complete the safe alternative route, to monitor the remaining power and the location of the vehicle while continuing to execute the order.

9. The method according to claim 8, further comprising:
   terminating, by the vehicle server, based on determining the current remaining power of the commercial vehicle is insufficient to complete the safe alternative route, the order and displaying indication information to indicate a driver of the commercial vehicle to go to the safe point according to the safe alternative route.

10. The method according to claim 7, further comprising:
    returning, by the vehicle server, based on determining the remaining power of the commercial vehicle is insufficient to complete the safe driving route, an order rejection message to the order allocation apparatus; and displaying warning message, wherein the warning message indicates that the order fails to be received because of an insufficient power of the commercial vehicle.

11. The method according to claim 7, further comprising:
    calculating, by the vehicle server, an average power consumption per kilometer of the commercial vehicle based on a historical driving mileage record and a historical power consumption record of the commercial vehicle; and calculating, by the vehicle server based on the average power consumption per kilometer of the vehicle, an estimated power consumption required by the safe driving route.

12. An order allocation apparatus, comprising:
    a processor; and
    a non-transitory computer-readable storage medium storing a program to be executed by the processor, the program including instructions to:
       obtain vehicle information about a plurality of commercial vehicles and safe point information, wherein the commercial vehicles comprise an electric vehicle, wherein vehicle information about the electric vehicle comprises a current location and a remaining power of the vehicle, wherein safe point information indicates a safe point, and wherein a safe point is a charging point of the electric vehicle;
       receive order request information sent by a user, wherein the order request information comprises a start location and a destination location;
       select a candidate vehicle that serves the user from the plurality of commercial vehicles;
       generate, based on the candidate vehicle being the electric vehicle, a safe driving route for the candidate vehicle, wherein the safe driving route is a route connecting a current location of the candidate vehicle, the start location, the destination location, and a location of a safe point closest to the destination location; and
       send, based on determining a remaining power of the candidate vehicle is sufficient to complete the safe driving route, an order allocation message to the candidate vehicle notifying the candidate vehicle as a service vehicle of the user.

13. The apparatus according to claim 12, wherein the instructions further comprise instructions to:
    continuously monitor a remaining power and a location of the service vehicle while the service vehicle provides a transport service for the user;
    determine, based on determining a current remaining power of the service vehicle is insufficient to complete a remaining safe driving route, a location of a safe point closest to a current location of the service vehicle;
    generate a safe alternative route for the service vehicle, wherein the safe alternative route is a route connecting the current location of the service vehicle and the location of the closest safe point; and
    continue to monitor, based on determining the current remaining power of the service vehicle is sufficient to complete the safe alternative route, the remaining power and the location of the service vehicle.

14. The apparatus according to claim 13, wherein the instructions further comprise instructions to:
    send a power saving notification to the service vehicle based on determining the current remaining power of the service vehicle is sufficient to complete the safe alternative route.

15. The apparatus according to claim 13, wherein the instructions further comprise instructions to:
    notify, based on determining the current remaining power of the service vehicle is insufficient to complete the safe alternative route, the service vehicle to terminate an order and go to the safe point according to the safe alternative route.

16. The apparatus according to claim 12, wherein the instructions further comprise instructions to:

send, based on determining the remaining power of the candidate vehicle is insufficient to complete the safe driving route, a warning message to the candidate vehicle and cancel the order for the candidate vehicle, wherein the warning message indicates that a reason why order allocation fails is that the vehicle has an insufficient power.

17. The apparatus according to claim 16, wherein the instructions further comprise instructions to:

calculate an average power consumption per kilometer of the service vehicle, based on a historical driving mileage record and a historical power consumption record of the service vehicle; and calculate, based on the average power consumption per kilometer of the service vehicle, an estimated power consumption required by the safe driving route.

18. A vehicle server apparatus, comprising:

a processor; and a non-transitory computer-readable storage medium storing a program to be executed by the processor, the program including instructions to:

send vehicle information to an order allocation apparatus, wherein the vehicle information comprises a current location and a remaining power of a commercial vehicle;

receive an order allocation message sent by the order allocation apparatus, wherein the order allocation message carries a start location and a destination location of a user; and receive, based on determining the remaining power of the commercial vehicle is sufficient to complete a safe driving route, an order to provide a transport service for the user by the commercial vehicle, wherein the safe driving route is a route connecting the current location of the commercial vehicle, the start location of the user, the destination location of the user, and a location of a safe point closest to the destination location, and wherein the safe point is a charging point of an electric vehicle.

19. The apparatus according to claim 18, the instructions further comprising instructions to:

continuously monitor the remaining power and the location of the commercial vehicle while providing the transport service for the user;

determine, based on determining the current remaining power of the commercial vehicle is insufficient to complete a remaining safe driving route, a location of a safe point closest to the current location of the commercial vehicle;

generate a safe alternative route, wherein the safe alternative route is a route connecting the current location of the commercial vehicle and the location of the closest safe point; and continue, based on determining the current remaining power of the commercial vehicle is sufficient to complete the safe alternative route, to execute the order and continue to monitor the remaining power and the location of the commercial vehicle.

20. The apparatus according to claim 19, wherein the instructions further comprise instructions to:

terminate, based on determining the current remaining power of the commercial vehicle is insufficient to complete the safe alternative route, the order and display indication information to indicate a driver of the commercial vehicle to go to the safe point according to the safe alternative route.

* * * * *